L. G. FLEMING.
DEMOUNTABLE RIM.
APPLICATION FILED DEC. 31, 1914.

1,206,522.

Patented Nov. 28, 1916.
2 SHEETS—SHEET 1.

WITNESSES
Edw. Thorpe
Roy Horter

INVENTOR
Luke G. Fleming
BY Munn & Co
ATTORNEYS

L. G. FLEMING.
DEMOUNTABLE RIM.
APPLICATION FILED DEC. 31, 1914.
1,206,522.
Patented Nov. 28, 1916.
2 SHEETS—SHEET 2.
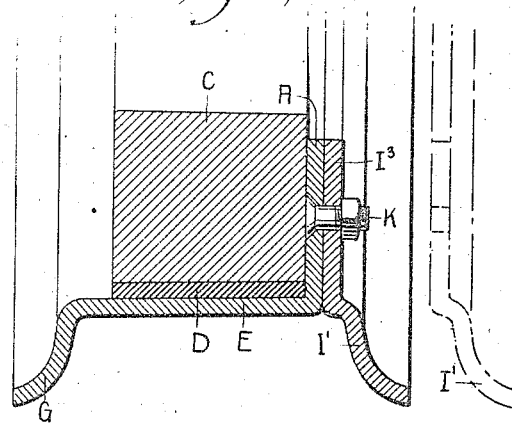
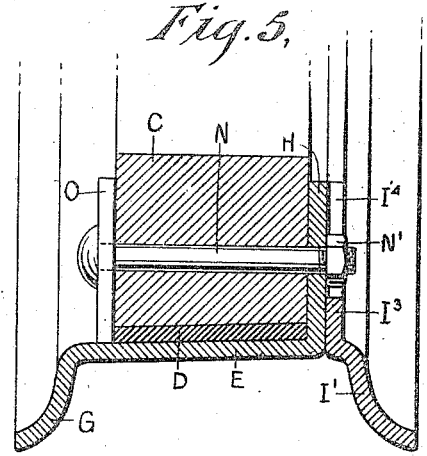
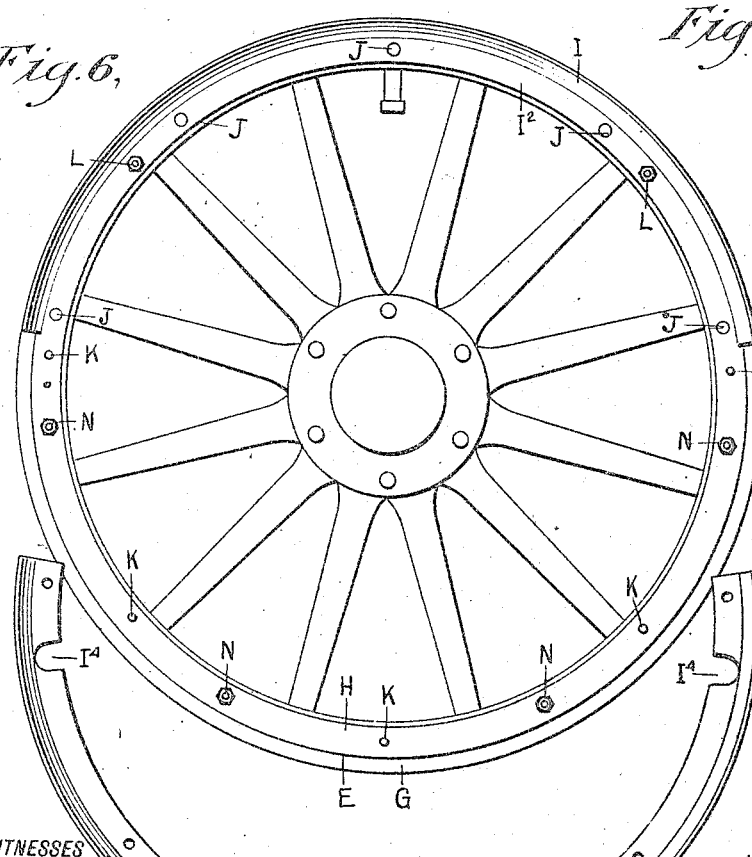
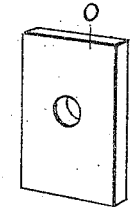
WITNESSES
Edw. Thorpe
INVENTOR
Luke G. Fleming
BY
Munn & Co
ATTORNEYS

UNITED STATES PATENT OFFICE.

LUKE G. FLEMING, OF TARRYTOWN, NEW YORK.

DEMOUNTABLE RIM.

1,206,522.     Specification of Letters Patent.     Patented Nov. 28, 1916.

Application filed December 31, 1914. Serial No. 879,894.

*To all whom it may concern:*

Be it known that I, LUKE G. FLEMING, a citizen of the United States, and a resident of Tarrytown, in the county of Westchester and State of New York, have invented a new and Improved Demountable Rim, of which the following is a full, clear, and exact description.

The invention relates to wheels for automobiles and other vehicles, and its object is to provide a new and improved demountable rim arranged to permit of conveniently and quickly placing a tire in position on the rim or removing it therefrom, and to allow of quickly removing the entire rim and its tire from the felly of the wheel and replacing it by another.

In order to accomplish the desired result, use is made of a rim ring provided with an inner integral tire flange, an outer integral abutting flange extending toward the hub and adapted to abut against the outer face of the felly, and an outer tire flange made in sections, of which one is permanently fastened to the said abutting flange and the other section is detachably secured to the said abutting flange. Use is also made of a felly reinforcing ring fitting on the peripheral face of the felly and being beveled inwardly and upwardly, and a rim having a ring engaging the said beveled face of the felly ring, and means for fastening the said rim to the felly.

A practical embodiment of the invention is represented in the accompanying drawings forming a part of this specification, in which similar characters of reference indicate corresponding parts in all the views.

Figure 1:
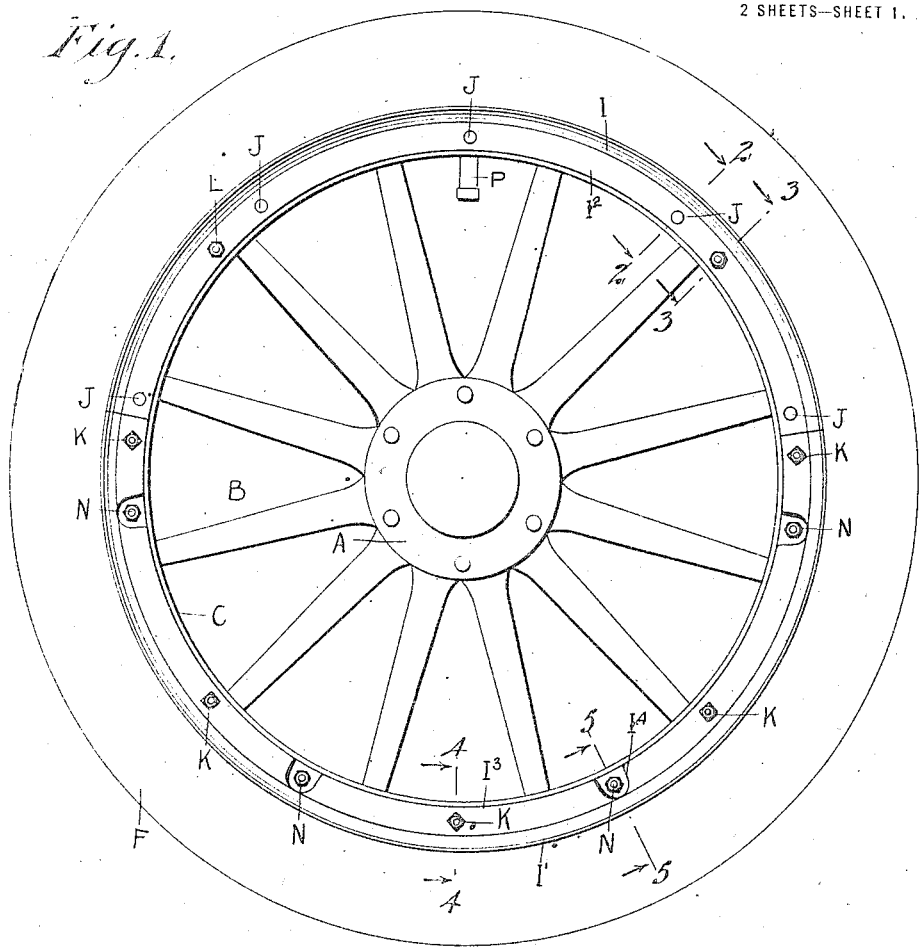
Figure 2:
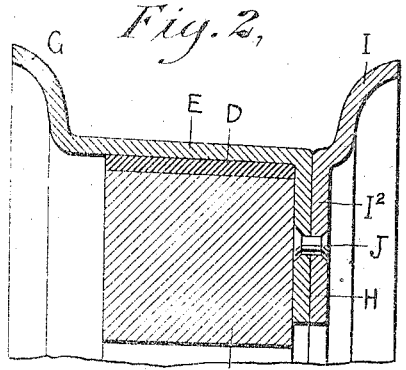
Figure 3:
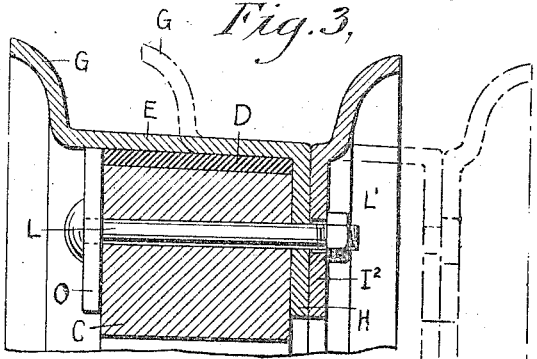

Figure 1 is a face view of an automobile wheel provided with the demountable rim; Fig. 2 is an enlarged cross section of the same on the line 2—2 of Fig. 1; Fig. 3 is a similar view of the same on the line 3—3 of Fig. 1; Fig. 4 is a like view of the same on the line 4—4 of Fig. 1; Fig. 5 is a similar view on the line 5—5 of Fig. 1; Fig. 6 is a face view of the wheel with the tire removed and the detachable section of the outer tire flange shown detached; Fig. 7 is a perspective view of one of the bolt washers; Fig. 8 is a cross section of a modified form of the demountable rim; and Fig. 9 is a similar view of another modified form of the demountable rim.

The wheel on which the demountable rim is shown applied in Figs. 1, 2, 3, 4, 5 and 6, consists of the usual hub A, spokes B and a felly C having its peripheral face beveled inwardly and upwardly and having this face reinforced by a felly ring D shrunk or otherwise fastened on the said felly. The peripheral face of the said felly ring D is beveled, corresponding to the bevel of the peripheral face of the felly C, as plainly indicated in Figs. 2, 3, 4 and 5. Onto the peripheral face of the felly ring D fits the correspondingly beveled ring E of the rim carrying the usual tire F, and the said rim ring E is provided on its inner edge with an integral tire flange G and is provided at its outer edge with a hubward extending abutting flange H abutting against the outer side of the felly C.

The outer tire flange for the tire F is made in two sections I and I', the sections having attaching flanges $I^2$ and $I^3$, of which the flange $I^2$ is permanently secured to the abutting flange H by rivets J or similar fastening devices (see Figs. 1 and 2). The other flange $I^3$ is detachably secured to the abutting flange H by the use of bolts K, as plainly shown in Figs. 1 and 4, to permit of detaching the outer tire flange section I' whenever it is desired to place a tire F in position on the rim or to remove such tire from the rim.

In order to removably hold the rim in position on the felly C, use is made of two sets of bolts L and N, of which the bolts L extend transversely through the felly C and through the abutting flange H and the attaching flange $I^2$ (see Figs. 1 and 3) with the nut L' of the bolt abutting against the outer side of the flange $I^2$. The bolts N extend transversely through the felly C and through the attaching flange H, and the nuts N' of the bolts N abut against the outer side of the attaching flange H and extend within cut-out portions $I^4$ formed in the attaching flange $I^3$ of the outer detachable tire flange I'. It will be noticed that by this arrangement the outer tire flange section I' can be readily removed on screwing the nuts of the bolts K without disturbing the bolts N (see Fig. 6). When it is desired to remove the rim from the felly C the nuts L' and N' of the two sets of bolts L and N are removed to allow of sliding the rim outwardly off the inclined face of the felly ring D, as will be readily understood by reference to the dotted lines in Fig. 3. A washer O of rectangular shape is placed on each bolt L and N between the head of the bolt and the rear face of the felly C and its ring D, to prevent the bolt head from cutting into the felly on screwing up the corresponding nuts L' and N'. The outer face of each washer O abuts against the under side of the rim ring E to hold the washer against turning.

It will be noticed that by providing a felly ring D having its peripheral face inclined inwardly and upwardly it is evident that the rim can be quickly detached by a slight pressure from the inside in an outward direction so that it takes but a comparatively short time to demount the rim.

In the construction disclosed in Fig. 8, the rim ring E' has its peripheral face parallel to the axis of the wheel and the said rim ring is provided at the under side with ribs $E^2$, $E^3$ of different height and adapted to be seated on the peripheral face of the rim of the felly ring D. Instead of two such ribs $E^2$, $E^3$, the rim ring $E^4$ may be provided with only one rib $E^5$, as shown in Fig. 9. In this case the inner edge of the rim ring E rests on the inner edge of the felly ring D while the rib $E^5$ is seated on the peripheral face of the felly ring D near the outer edge thereof. In either case the rim can be readily removed after the bolt nuts L' and N' have been removed, by pressure against the rim in an outward direction.

By reference to Fig. 1, it will be noticed that the removable section I' of the outer tire flange has its middle located directly opposite the valve stem P for inflating the tire F, and the said valve stem P extends through a transversely elongated opening (not shown) formed in the rim ring E to permit of conveniently removing the tire F from the rim or replacing it thereon at the time the section I' is removed, as previously explained.

Having thus described my invention, I claim as new and desire to secure by Letters Patent:

A rim for vehicle wheels, comprising a ring having at one edge an integral inner tire flange and at its other edge an inwardly extending flange for securing it to a felly, and an outer tire flange formed of two disconnected sections, one permanently secured to the inwardly extending flange of the ring and the other detachably secured to the said flange whereby the said detachable section may be bodily removed as and for the purpose set forth.

In testimony whereof I have signed my name to this specification in the presence of two subscribing witnesses.

LUKE G. FLEMING.

Witnesses:
 THEO. G. HOSTER,
 PHILIP D. ROLLHAUS.